(12) United States Patent
Schwarz et al.

(10) Patent No.: US 11,897,130 B2
(45) Date of Patent: Feb. 13, 2024

(54) PLANAR DRIVE DEVICE, AND METHOD FOR OPERATING A PLANAR DRIVE DEVICE

(71) Applicant: Syntegon Technology GmbH, Waiblingen (DE)

(72) Inventors: Sebastian Schwarz, Neusitz (DE); Marcus Kleinert, Wallhausen (DE)

(73) Assignee: Syntegon Technology GmbH, Waiblingen (DE)

( * ) Notice: Subject to any disclaimer, the term of this patent is extended or adjusted under 35 U.S.C. 154(b) by 106 days.

(21) Appl. No.: 17/844,902

(22) Filed: Jun. 21, 2022

(65) Prior Publication Data

US 2022/0410376 A1   Dec. 29, 2022

(30) Foreign Application Priority Data

Jun. 25, 2021 (DE) ...................... 10 2021 116 528.8

(51) Int. Cl.
| | |
|---|---|
| *H02K 41/00* | (2006.01) |
| *H02P 1/00* | (2006.01) |
| *H02P 3/00* | (2006.01) |
| *H02P 5/00* | (2016.01) |
| *B25J 9/10* | (2006.01) |

(52) U.S. Cl.
CPC .................................. *B25J 9/1065* (2013.01)

(58) Field of Classification Search
CPC ...................................................... B25J 9/1065

USPC ......................................................... 318/135
See application file for complete search history.

(56) References Cited

U.S. PATENT DOCUMENTS

| | | | |
|---|---|---|---|
| 7,331,750 B2 * | 2/2008 | Merz ........................ | B25J 9/104 414/735 |
| 2005/0129495 A1 * | 6/2005 | Brogardh ............... | B25J 9/0072 414/680 |
| 2022/0322592 A1 * | 10/2022 | Rinne ................ | H05K 13/0486 |

FOREIGN PATENT DOCUMENTS

| | | |
|---|---|---|
| DE | 102006038505 A1 | 2/2008 |
| WO | 2018176137 A1 | 10/2018 |
| WO | 2020243814 A1 | 12/2020 |

* cited by examiner

*Primary Examiner* — Erick D Glass
(74) *Attorney, Agent, or Firm* — Michael Best & Friedrich LLP

(57) ABSTRACT

A planar drive device having a first platform and having a second platform, which platforms are movable in an X-Y plane on a work bench, wherein the first platform has a frame, a transmission and a working platform for the arrangement of a work tool, wherein the transmission permits an adjustment of the distance of the working platform with respect to the X-Y plane, wherein the second platform has a frame and a drive member which is coupled in terms of movement at least indirectly to the working platform such that the distance of the working platform from the X-Y plane is adjustable by changing a distance between the two platforms within the X-Y plane. The work tool can be transferred into at least two different working states by relative movement of the platforms in the X-Y plane.

12 Claims, 4 Drawing Sheets it requires a power supply. A stationary power source which is connected via a line to a drive of the work tool can be kept ready for this purpose. A power store which is moved together with the working platform and is recharged at intervals can also be kept ready.

PLANAR DRIVE DEVICE, AND METHOD FOR OPERATING A PLANAR DRIVE DEVICE

BACKGROUND

The invention relates to a planar drive device having a first platform and having a second platform, which platforms are movable in an X-Y plane on a workbench, wherein the first platform has a frame, a transmission and a working platform for the arrangement of a work tool, wherein the transmission permits an adjustment of the distance of the working platform with respect to the X-Y plane, wherein the second platform has a frame and a drive member which is coupled in terms of movement at least indirectly to the working platform such that the distance of the working platform from the X-Y plane is adjustable by changing a distance between the two platforms within the X-Y plane.

Planar drive devices which are mentioned at the beginning are known from WO 2018/176137 A1, WO 2020/243 814 A1, and DE 10 2006 038 505 A1. The platforms thereof are also referred as to as "movers" which are drivable on the workbench, for example, by magnetic forces. The platforms are freely movable within the X-Y plane. A distance of a work tool arranged on the first working platform from the X-Y plane can likewise be adjusted by movement of the platforms, and therefore the work tool can be freely positioned in space.

SUMMARY

In order to actuate the work tool, it requires a power supply. A stationary power source which is connected via a line to a drive of the work tool can be kept ready for this purpose. A power store which is moved together with the working platform and is recharged at intervals can also be kept ready.

The present invention is based on the object of being able to actuate a work tool of the device in a simple manner.

This object is achieved in the case of a planar drive device of the type mentioned at the beginning in that for the adjustment of the distance of the working platform from the X-Y plane, the drive member and the transmission are effective in a movement plane perpendicular to the X-Y plane, in that the drive member is movable relative to the working platform along a working axis perpendicular to the movement plane, and in that a first portion of the work tool is connected to the drive member and a second portion of the work tool is connected to the working platform such that, by relative movement of the platforms in the X-Y plane in a direction parallel to the working axis, the work tool can be transferred into at least two different working states in which the first portion and the second portion take up different relative positions from one another.

The planar drive device according to the invention has the advantage that the power which is required for actuating the work tool can be provided by a relative movement of the platforms which move on the work bench. The drives and drive energy required for this movement are already available for moving the platforms in the X-Y movement. This makes it possible to be able to dispense with additional components, mentioned at the beginning, of a further power supply—which is assigned only to the work tool. This has the advantage that the work tool can be positioned freely unobstructed by lines (in comparison to a stationary power source), and that the working platform can be used exclusively for the arrangement to the work tool (in comparison to a power store arranged on the working platform).

In order to adjust the distance of the working platform from the X-Y plane, the drive member of the second platform and the members or a partial quantity of the members of the transmission and the working platform of the first platform move in a plane of movement perpendicular to the X-Y plane. This permits a freely selectable positioning of the work tool within an X-Y-Z space.

The second platform and its drive member are movable along a working axis relative to the working platform in a direction perpendicular to the plane of movement mentioned. However, the drive member here is preferably connected immovably to a first portion of the work tool, and therefore a movement of the second platform in a direction parallel to the working axis is associated with said first portion of the work tool moving together with the second platform parallel to the working axis. This produces a relative movement to a second portion of the work tool that is connected preferably immovably to the working platform. In this way, it is possible to transfer the work tool into at least two different working states without having to resort to an additional power supply.

It is particularly preferred if the work tool has a plurality of working regions. The working states thereof can likewise be changed—preferably simultaneously to one another—by a relative movement of the two platforms in a direction parallel to the working axis.

In particular, it is preferred if the work tool is a gripping tool which is closed in a first working state and is open in a second working state differing from the first working state. An open state of the gripping tool corresponds here to the fact that the gripping tool is movable relative to at least one object to be gripped. The closed state therefore corresponds to the fact that at least one object is held at the gripping tool.

A preferred embodiment makes provision for the transmission to be designed as a four-bar chain or linkage, wherein the frame and the working platform form two transmission members. These transmission members are coupled to each other in particular via a double rocker.

In particular, it is preferred that the four-bar chain or linkage is designed as a parallelogram guide with four rotary joints. This permits a precise and simple change in the position of the working platform in order to adjust the distance of the working platform relative to the X-Y plane.

It is also preferred for the drive member of the second platform if said drive member is mounted on the second platform by means of a rotary joint. This permits the simple provision of a crank member which interacts at least indirectly with the working platform. The drive member can be connected movably to the working platform itself or else to part of the transmission on the first platform.

In particular, it is preferred if the drive member is coupled in terms of movement (at least indirectly) to the working platform by means of a rotary prismatic joint. This means that, during a movement within the plane of movement, the drive member changes the position of an axis of rotation of the rotary prismatic joint within the plane of movement (for the purpose of adjusting the distance of the working platform) and that, by movement of the drive member parallel to the axis of rotation of the rotary prismatic joint (corresponds to the working axis), the work tool is actuated in the above-described manner.

In particular, it is preferred that a pivot bolt of the rotary prismatic joint at the same time forms a rotary joint of the transmission. A particularly simple and reliable construction can thereby be provided.

A further simplification of the construction is produced if the two frames of the two platforms are provided as identical parts.

Furthermore, it is preferred if a stop is provided for the transmission in order to define an end position of the work tool. This stop is preferably arranged on the frame of the first platform. This permits a particularly precise positioning of the work tool.

It is furthermore preferred if the work tool projects at least in an end position beyond a border of the X-Y plane of the work bench. In this way, the work tool can also be positioned in a production region arranged outside the work bench.

The invention furthermore relates to a method for operating a planar drive device above. According to the invention, the two platforms are driven in the X-Y plane in such a manner that a distance of the working platform from the X-Y plane changes along a Z axis which is perpendicular to the X-Y plane. In this way, the work tool can be raised and lowered in the direction perpendicular to the X-Y plane.

In order to transfer the work tool into a changed working state, it is preferred if the first platform is at a standstill and the second platform is moved. This permits an actuation of the work tool with the second portion of the work tool not being operated.

BRIEF DESCRIPTION OF THE DRAWINGS

Further features and advantages of the invention are the subject matter of the description below and of the graphical illustration of a preferred exemplary embodiment.

In the drawing.

DETAILED DESCRIPTION

Figure 1:
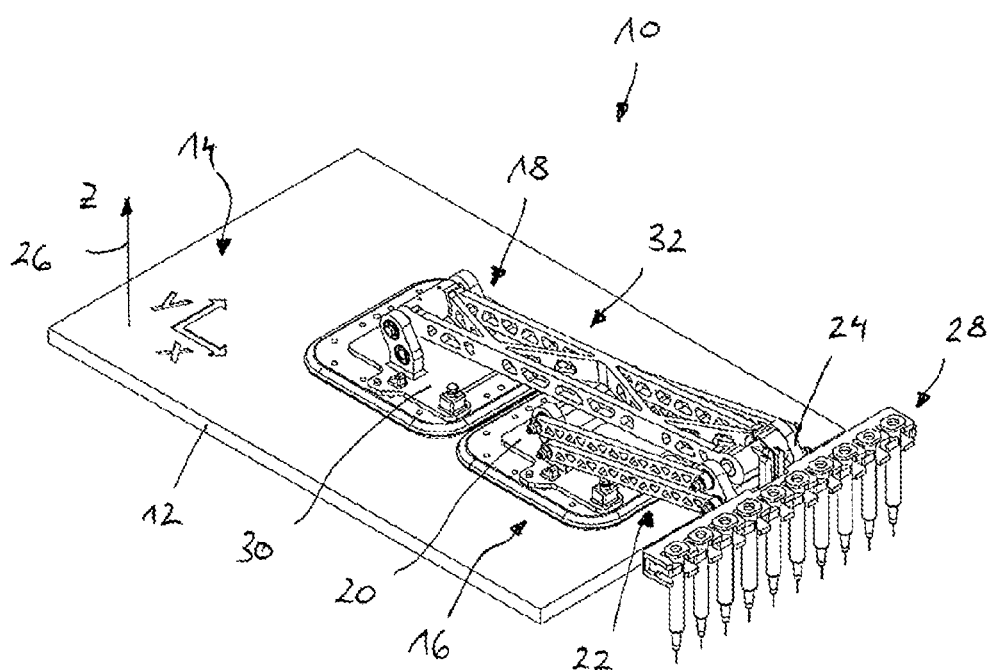
FIG. 1 shows a perspective view of an embodiment of a planar drive device with a work tool and with objects held at the work tool.

A planar drive device is denoted overall in the drawing by the reference sign 10. It comprises a work bench 12 which defines a rectilinear X-Y plane 14 in which a first platform 16 and, independently thereof, a second platform 18 are drivable movably.

The first platform 16 comprises a frame 20, a transmission 22, and a working platform 24 for the arrangement of a work tool 28. The distance of the working platform 24 and of the work tool from the X-Y plane 14 is adjustable such that the work tool 28 can be positioned freely in a space which is defined by the X-Y plane 14 and Z axis 26 which is perpendicular thereto.

The second platform 18 comprises a frame 30 and a drive member 32.

The frame 20 of the first platform 16 comprises a frame part 34 for the arrangement of two rotary joints 36 and 38. A rocker 40 or 42 is mounted rotatably on each of said rotary joints. The rockers 40 and 42 for their part are connected rotatably to the working platform 24 via a third rotary joint 44 and a fourth rotary joint 46, respectively.

Since the distance between the first rotary joint 36 and the second rotary joint 38 is identical to the distance between the third rotary joint 44 and the fourth rotary joint 46 and since the distances between the joints of the rockers 40 and 42 are identical, the transmission 22 forms a four-bar chain or linkage in the form of a parallelogram guide. This makes it possible for the working platform 24 to maintain an identical orientation along a circular-arc-shaped movement about the frame part 34, compare reference signs 24 and 24' in FIG. 2. In this way, an object 48 which is held on the work tool 28 can also maintain its spatial position, compare reference sign 48' in FIG. 2.

The frame 30 of the second platform 18 comprises a frame part 50 which preferably has an identical construction to the frame part 34. The frame part 50 serves for the arrangement of a rotary joint 52 for the rotational mounting of the drive member 32 which is preferably provided in the form of a crank rod 54.

Figure 3:
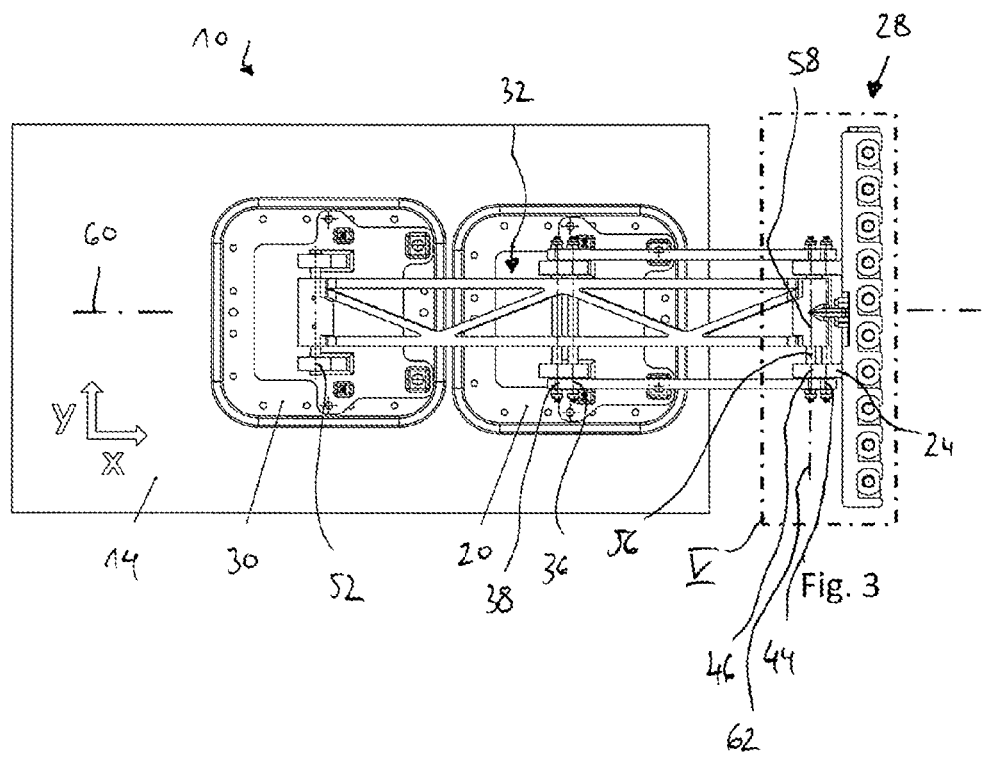
FIG. 3 shows a top view of the planar drive device according to FIG. 1.

The fourth rotary joint 46 of the transmission 22 of the first platform 16 comprises a pivot bolt 56, compare FIG. 3. An end of the drive member 32 that is spaced apart from the rotary joint 52 is connected via a rotary prismatic joint 58 to said pivot bolt 56. The drive member 32 is therefore rotatable about the pivot bolt 56 in the region of the rotary prismatic joint 58 and at the same time is displaceable relative to the pivot bolt 56 parallel to the axis of rotation of the rotary joint 46.

An adjustment of the distance of the working platform 54 from the X-Y plane 14 is associated with a movement of the rockers 40 and 42 and of the working platform 24 of the first platform 16 and of the drive member 32 of the second platform 18 within a plane of movement 60. The latter is oriented perpendicular to the X-Y plane 14, compare FIG. 3.

Figure 2:
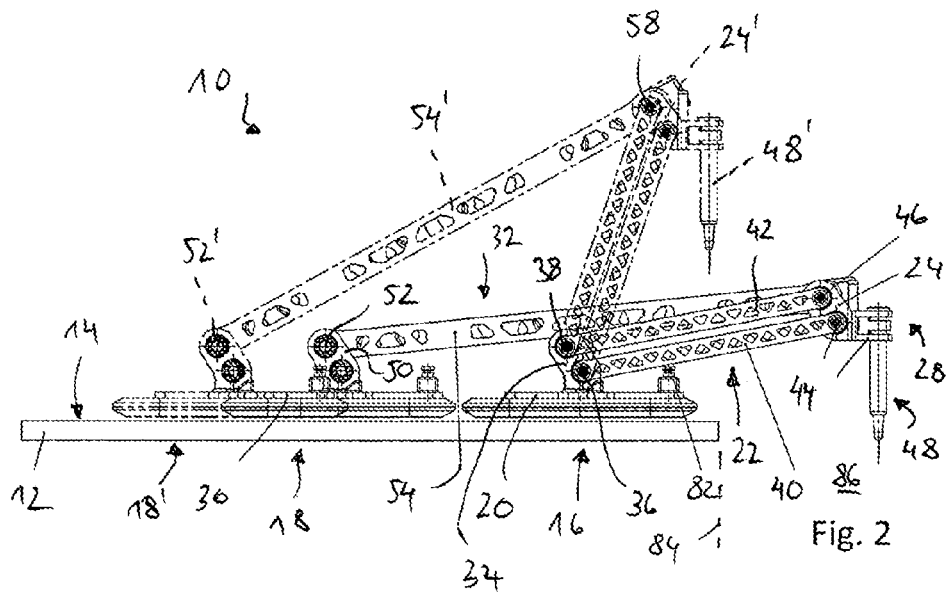
FIG. 2 shows a side view of the planar drive device according to FIG. 1.

In order to adjust a changed distance of the working platform 24 from the X-Y plane 14, a distance between the two platforms 16 and 18 within the X-Y plane 14 is changed, compare FIG. 2, in which a movement of the second platform 18 is indicated by dashed lines, compare reference sign 18'. The first platform 16 is preferably not in operation here.

By means of the above-described relative movement of the frames 20 and 30 of the platforms 16 and 18, respectively, the crank member 54 is pivoted about the rotary joint 52. This movement is transmitted by the rotary prismatic joint 58—within the plane of movement 60—to the pivot bolt 56 which, in turn, drives the working platform 24 and the rockers 40 and 42 for a circular-arc-shaped movement of the working platform 24 relative to the frame 20 of the first platform 16.

Figure 4:
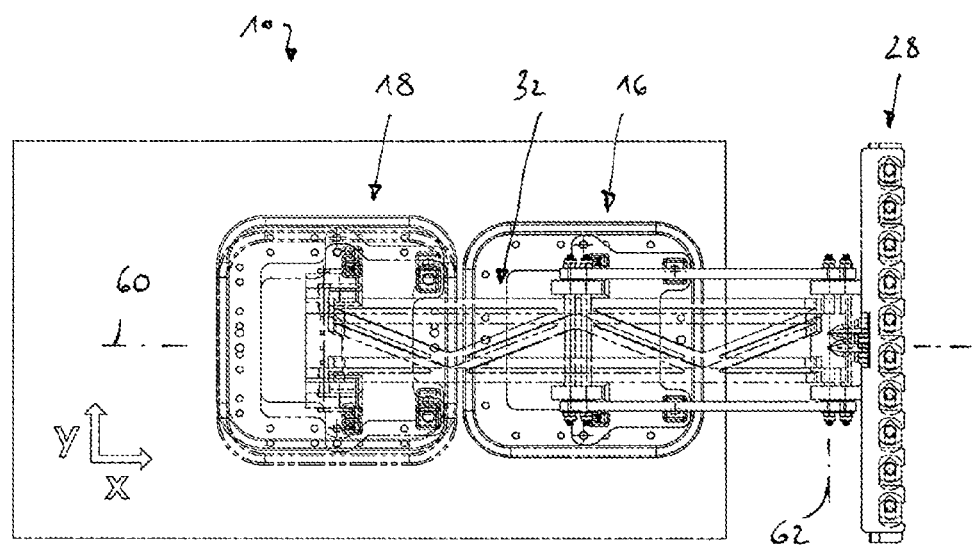
FIG. 4 shows a top view, corresponding to FIG. 3, of the planar drive device upon actuation of the work tool.

The rotary axes of all of the rotary joints 36, 38, 44, 46 and 52 run parallel to one another and perpendicularly to the plane of movement 60. At the same time, the drive member 32 is movable relative to the working platform 24 along a working axis 62 perpendicular to the plane of movement 60 (compare FIGS. 3 and 4) by means of the rotary prismatic joint 58. This movability is shown in FIG. 4 by chain-dotted illustrations of the second platform 18 and of the drive member 32.

Figures 5, 6:
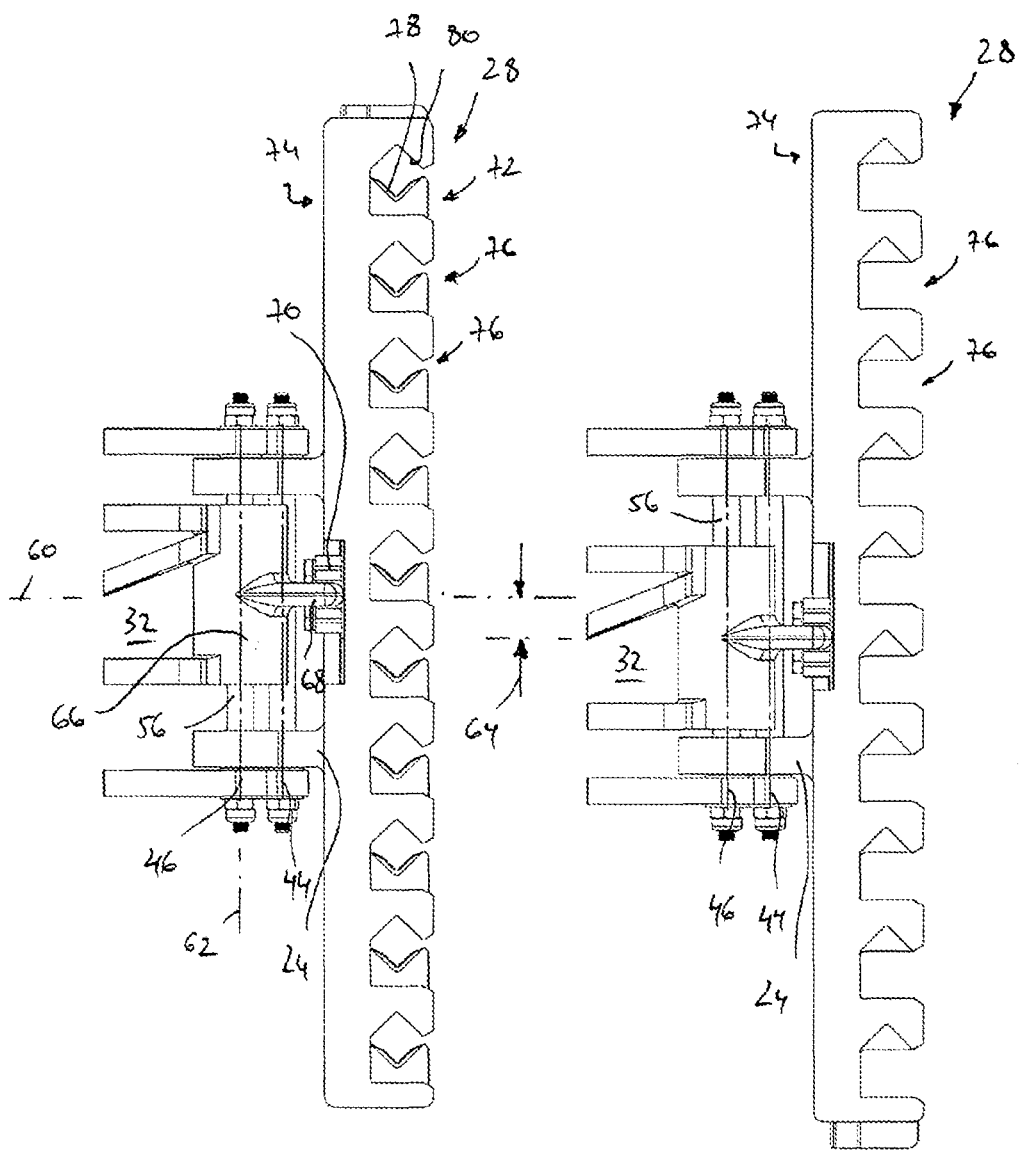
FIG. 5 shows a detail, denoted by V in FIG. 3, in an enlarged illustration, without objects and in a closed working state of the work tool.
FIG. 6 shows an illustration corresponding to FIG. 5 in an open working state of the work tool.

Such a movement in a direction parallel to the working axis 62 is associated with an offset 64, illustrated in FIGS. 5 and 6, of the drive member 32 along the working axis 62 and perpendicular to the plane of movement 60.

The drive member 32 has a bearing sleeve 66 which is arranged on the end side and is intended for the rotatable and displaceable receiving of the pivot bolt 56. The drive member 32 is furthermore connected via a coupling portion 68 to a receiving region 70 of a first portion 72 of the work tool 28. A movement of the drive member 32 in a direction parallel to the working axis 62 is therefore transmitted to the first portion 72 of the work tool 28 via the coupling portion 68 and the receiving portion 70.

A second portion 74 of the work tool 28 is fixedly connected to the working platform 24.

The work tool 28 has a plurality of working regions 76 which are in particular each designed as gripping regions. These gripping regions can be closed for gripping an object 48 (first working state of the work tool 28, compare FIG. 5) or can be opened for releasing an object 48 (second working state of the work tool 28, compare FIG. 6).

The first portion 72 of the work tool 28 has a gripping surface 78 which faces a gripping surface 80 of the second portion 74 of the work tool 28. The change in the distance between the gripping surfaces 78, 80 is associated with closing of the gripping regions 76 (compare FIG. 5) or with an opening of the gripping regions 76 (compare FIG. 6).

The gripping regions 76 are opened and closed by the frame 30 of the second platform 18 being driven in the X-Y plane—when the first platform 16 is preferably at a standstill—in a direction parallel to the working axis 62, as a result of which the drive member 32 is displaced along the working axis 62 and therefore entrains the coupling portion 68 and the receiving portion 70 and the first portion 72 of the work tool 28 and thus changes the distance of the gripping surfaces 78 relative to the stationary gripping surfaces 80 of the second portion 74 of the work tool 28.

It is possible, but not required, that the work tool 28 is actuated in an end position of the transmission 22, in which the transmission 22 takes up an end position. For the definition of such an end position, a stop 82 can be provided which is preferably arranged on the frame 20 of the first platform 16 and which serves as a support for the rocker 40. This is advantageous in particular if, in said end position, the work tool 28 projects beyond a boundary 84 of the work bench 12 (cf. FIG. 2) such that the work tool can also be positioned in a production region 86 outside the work bench 12.

The invention claimed is:

1. A planar drive device (10) having a first platform (16) and having a second platform (18), which platforms are movable in an X-Y plane (14) on a work bench (12), wherein the first platform (16) has a frame (20), a transmission (22) and a working platform (24) for the arrangement of a work tool (28), wherein the transmission (22) permits an adjustment of the distance of the working platform (24) with respect to the X-Y plane (14), wherein the second platform (18) has a frame (30) and a drive member (32) which is coupled in terms of movement at least indirectly to the working platform (24) such that the distance of the working platform (24) from the X-Y plane (14) is adjustable by changing a distance between the two platforms (16, 18) within the X-Y plane (14), wherein, for the adjustment of the distance of the working platform (24) from the X-Y plane (14), the drive member (32) and the transmission (22) are effective in a movement plane (60) perpendicular to the X-Y plane (14), in that the drive member (32) is movable relative to the working platform (24) along a working axis (62) perpendicular to the movement plane (60), and in that a first portion (72) of the work tool (28) is connected to the drive member (32) and a second portion (74) of the work tool (28) is connected to the working platform (24) such that, by relative movement of the platforms (16, 18) in the X-Y plane (14) in a direction parallel to the working axis (62), the work tool (28) can be transferred into at least two different working states in which the first portion (72) and the second portion (74) take up different relative positions from one another.

2. The planar drive device (10) according to claim 1, wherein the work tool (28) has a plurality of working regions (76).

3. The planar drive device (10) according to claim 1, wherein the work tool (28) is a gripping tool which is closed in a first working state and is open in a second working state differing from the first working state.

4. The planar drive device (10) according to claim 1, wherein the transmission (22) is designed as a four-bar linkage, wherein the frame (20) and the working platform (24) form two transmission members.

5. The planar drive device (10) according to claim 4, wherein the four-bar linkage is designed as a parallelogram guide with four rotary joints (36, 38, 44, 46).

6. The planar drive device (10) according to claim 1, wherein the drive member (32) is mounted on the second platform (18) by a rotary joint (52).

7. The planar drive device (10) according to claim 1, wherein the drive member (32) is coupled for movement to the working platform (24) by a rotary prismatic joint (58).

8. The planar drive device (10) according to claim 7, wherein a pivot bolt (56) of the rotary prismatic joint (58) at the same time forms a rotary joint (46) of the transmission (22).

9. The planar drive device (10) according to claim 1, wherein the two frames (20, 30) of the two platforms (16, 18) are provided as identical parts.

10. The planar drive device (10) according to claim 1, wherein a stop (82) is provided for the transmission (22) in order to define an end position of the work tool (28).

11. The planar drive device (10) according to claim 1, wherein the work tool (28) projects at least in an end position beyond a border (84) of the X-Y plane (14) of the work bench (12).

12. A method for operating a planar drive device (10) according to claim 1, wherein the two platforms (16, 18) are driven in the X-Y plane (14) in such a manner that a distance of the working platform (24) from the X-Y plane (14) changes along a Z axis (26) which is perpendicular to the X-Y plane (14), and/or wherein, in order to transfer the work tool (28) into a changed working state, the first platform (16) is stationary and the second platform (18) is moved.

* * * * *